(12) United States Patent
Kamiya (10) Patent No.: US 8,388,425 B2
(45) Date of Patent: Mar. 5, 2013

(54) GAME DEVICE, METHOD AND PROGRAM FOR ENLARGING AN OPERATIONAL OBJECT ACCORDING TO THE SPEED OR ACCELERATION OF A MOVING CONTROLLER

(75) Inventor: Keisuke Kamiya, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 279 days.

(21) Appl. No.: 12/642,455

(22) Filed: Dec. 18, 2009

(65) Prior Publication Data

US 2010/0099492 A1    Apr. 22, 2010

Related U.S. Application Data

(63) Continuation of application No. PCT/JP2008/060219, filed on Jun. 3, 2008.

(30) Foreign Application Priority Data

Jun. 29, 2007    (JP) ................. 2007-172921

(51) Int. Cl.
*A63F 9/24* (2006.01)
*A63F 13/00* (2006.01)

(52) U.S. Cl. ............ 463/5; 463/7; 463/30; 463/31; 463/32; 463/33; 463/37

(58) Field of Classification Search ............. 463/7, 5, 463/30–33, 37
See application file for complete search history.

(56) References Cited

U.S. PATENT DOCUMENTS

| 6,139,432 | A | 10/2000 | Watanabe et al. |
| 7,601,066 | B1 | 10/2009 | Masuyama et al. |
| 2003/0130037 | A1* | 7/2003 | Sugimori et al. ........... 463/37 |
| 2004/0029640 | A1 | 2/2004 | Masuyama et al. |
| 2007/0060385 | A1 | 3/2007 | Dohta |
| 2008/0076566 | A1* | 3/2008 | Miyamoto ................. 463/37 |

FOREIGN PATENT DOCUMENTS

| JP | 2000-070546 A | 3/2000 |
| JP | 2000-116951 A | 4/2000 |
| JP | 2000-288253 A | 10/2000 |
| JP | 2001-170358 A | 6/2001 |
| JP | 2005-319136 A | 11/2005 |
| JP | 2007-080002 A | 3/2007 |
| TW | 200403091 | 3/2004 |

OTHER PUBLICATIONS

Moraff's Super Blast I, retrieved from http://www.classicdosgames.com/game/Moraff's_Super_Blast_I.html, based on a game released on Dec. 1990, pp. 1-2.*
Dosgames.com, http://www.dosgames.com/g_bnp.php, retrieved on May 18, 2012, pp. 1-5.*

* cited by examiner

*Primary Examiner* — Sunit Pandya
*Assistant Examiner* — Jasson Yoo
(74) *Attorney, Agent, or Firm* — Global IP Counselors, LLP (57) ABSTRACT

A game device (2) executes a video game in which a hammer image (52) displayed on a display device (4) is moved based on an operational signal. The hammer image (52) corresponds to a controller (3), and the operational signal indicates acceleration detected by an acceleration sensor (21) embedded in the controller (3). Additionally, the game device (2) includes an operation-target object control section (32). The operation-target object control section (32) displays an enlarged hammer image (52') instead of the hammer image (52) when at least either of the acceleration indicated by the operational signal or moving speed of the controller (3) computed based on the acceleration falls within a predetermined range.

20 Claims, 6 Drawing Sheets

GAME DEVICE, METHOD AND PROGRAM FOR ENLARGING AN OPERATIONAL OBJECT ACCORDING TO THE SPEED OR ACCELERATION OF A MOVING CONTROLLER

CROSS-REFERENCE TO RELATED APPLICATIONS

This application is a continuation application of International Application No. PCT/JP2008/060219 filed on Jun. 3, 2008, which claims priority to Japanese Patent Application No. 2007-172921 filed on Jun. 29, 2007. The entire disclosures of International Application No. PCT/JP2008/060219 and Japanese Patent Application No. 2007-172921 are hereby incorporated herein by reference.

BACKGROUND OF THE INVENTION

1. Field of the Invention

The present invention relates to a game device and the like for executing a game wherein an object displayed on a display screen, corresponding to a game controller, is moved based on an operation signal indicating acceleration detected by an acceleration sensor embedded in the game controller.

2. Background Information

In general, conventional game devices for playing video games are provided with a game controller having a plurality of operation buttons. In the conventional video games, a game character and the like, displayed on a display apparatus (e.g., a television set) to which the game device is connected, take actions in conjunction with a game player's input operation through the operation buttons of the game controller.

However, many people who are unfamiliar with the video games have been reluctant to play conventional video games that cause a game character to take action in conjunction with a game player's input operation through the operation buttons of the game controller.

In response to this, various types of game devices with intuitive controls have been recently proposed to allow anyone intuitively to enjoy playing video games without performing complex button operations. For example, game devices using a controller provided with an acceleration sensor are now popular. In this type of game device, video games proceed while the moving speed and the moving direction of the controller, detected by the acceleration sensor, are used as operational inputs.

For example, Japanese laid-open patent publication No. JP-A-2006-142045 (disclosed on Jun. 8, 2006) discloses a video game that a game player can play with the aforementioned game device. In the video game, a game character that is displayed on a display screen moves in conjunction with movement of the controller operated by the game player. Therefore, a game player can intuitively play the video game without learning complex button operations. As a result, even people who have been unfamiliar with video games so far feel free to enjoy playing the video game.

The aforementioned game device that uses a controller provided with an acceleration sensor is a remarkable device for playing a video game because it allows a game player intuitively to operate and to make anyone feel free to enjoy playing.

However, the conventional video games that are allowed to be played with a game device using a controller provided with an acceleration sensor have underutilized properties of the game device so far. Therefore, the video games still have room for improvement in order to realize a high entertainment value.

According to the conventional video games, when a game player moves a controller, only a specific game character that corresponds to the controller of a variety of game characters displayed on a display screen moves in conjunction with movement of the controller. Therefore, conventional video games lack amusement in a display method of the game character itself. For example, according to the game device provided with the acceleration sensor, disclosed in the aforementioned patent publication, a game character displayed on a display unit moves and jumps in conjunction with the tilt of the game device (i.e., the controller) and the impact applied to the game device (i.e., the controller). However, a display method in the game device of the aforementioned patent publication is not beyond movement of a game character itself.

In view of the above, it will be apparent to those skilled in the art from this disclosure that there exists a need for an improved game device, game control method, game control program, and computer-readable recording medium on which the program is recorded. This invention addresses this need in the art as well as other needs, which will become apparent to those skilled in the art from this disclosure.

SUMMARY OF THE INVENTION

The present invention is produced in view of the above. It is an object of the present invention to provide a video game device and the like for achieving a video game having a more variety of changes and a higher amusement value than the conventional video games.

To solve the aforementioned drawback, the present invention produces a game device executing a video game in which a first object displayed on a display screen is moved based on an operational signal. The first object herein preferably corresponds to a controller, and the operational signal preferably indicates acceleration detected by an acceleration sensor embedded in the controller. The game device is also characterized to include object change means for displaying a second object instead of the first object when at least either of the acceleration indicated by the operation signal and moving speed of the controller computed based on the acceleration falls in a predetermined range. The second object is herein different from the first object.

Furthermore, to solve the aforementioned drawback, the present invention produces a game control method of a game device executing a video game in which a first object displayed on a display screen is moved based on an operational signal. The first object herein preferably corresponds to a controller, and the operational signal indicates a position of the controller provided with an acceleration sensor with respect to the display screen and acceleration detected by the acceleration sensor. The game control method is characterized to include a step of displaying a second object instead of the first object when at least either of the acceleration indicated by the operation signal and moving speed of the controller computed based on the acceleration falls in a predetermined range. The second object herein is different from the first object.

According to the configuration, the first object is changed into the second object in accordance with the moving speed of the acceleration for moving the controller. Therefore, it is possible to produce a game having a much greater deal of variety and a higher amusement value than those of the conventional games just configured to move the first object on the display screen in accordance with movement of the controller.

Moreover, the controller, which is held by a game player who is playing the game, is virtually represented by the first object and the second object changed from the first object in the game space. Therefore, the configuration makes a game player have a feeling that the controller he/she is holding in the real world is changed while playing the game. Consequently, the game can realize an interesting value that the conventional video games have never realized.

Furthermore, the object change means preferably displays the first object again instead of the second object when an operational signal, which indicates detection of the acceleration or the moving speed falling in the predetermined range, is not found within a predetermined period of time after the second object is displayed.

According to the aforementioned configuration, even if the second object is displayed once, the first object is set to be displayed again when the acceleration or the moving speed, included in a predetermined range, is not subsequently detected. To maintain a condition in which the second object is displayed, a player of the aforementioned game is therefore required to keep moving the controller at the acceleration or the moving speed, which is included in a predetermined range. Consequently, the game will have a much greater deal of variety and a higher amusement value.

Especially when it is preferable to change the first object into the second object and to maintain the state of the object in order to progress the game in an advantageous condition for a game player, for example, when use of a large hammer is more advantageous than that of a small hammer in order to whack a plurality of opponent characters, a game player is required to perform a series of actions including raising and swinging the hammer (i.e., the controller) at high speed in order to maintain the state of using the large hammer. The sense of tension accordingly enhances interest and value in the game.

Furthermore, the object change means preferably changes the first object into the second object by at least partially enlarging or reducing the first object.

According to this configuration, the size of the object to be displayed on the display screen is increased or reduced in accordance with the speed at which a game player moves the controller. In other words, according to the configuration, the moving speed of the controller is reflected on the display screen in a visual easily understood form. Therefore, everyone can easily understand the game. Additionally, the speed at which a game player moves the controller is added to the game as a factor. Therefore, the game will have a higher amusement value.

Moreover, according to the configuration, the second object can be obtained by executing a computation to expand or to reduce the first object. The amount of the computation to be executed by the game device can be further reduced relative to a case in which the second object is changed into a predetermined image set to be different from the first object. Simultaneously, the amount of data, required to be stored in the game device, can be reduced.

Furthermore, the object change means preferably sets the speed of the first object moving on the display screen to be different from speed of the second object moving on the display screen with respect to an identical value of the acceleration or the moving speed indicated by the operational signal.

According to this configuration, when the object is changed, the moving speed of the post-changed object is accordingly changed from that of the pre-changed object even if a game player moves the controller at the identical speed. The game can be thereby more realistic. For example, when the moving speed of a larger object is set to be low, movement of the larger object will be slower than a game player imagined. Consequently, this configuration enables a game player to feel that the larger object is heavy.

Furthermore, the video game is preferably a type of game in which either of the first object and the second object is made to contact a third object in a virtual space of the game. The third object is herein different from the first object and the second object. Additionally, the game device preferably further includes object contact detection means and third object display control means. The object contact detection means herein detects a condition in which either of the first object and the second object makes contact with the third object in the virtual space of the game. On the other hand, the third object display control means controls at least either of post-contact action and post-contact shape of the third object in accordance with a contact condition detected by the object contact detection means.

According to this configuration, the post-contact action and the post-contact shape of the third object are changed in accordance with the contact condition of the third object with the first/second object. Accordingly, the game will have an even greater deal of variety and a higher amusement value.

For example, the contact condition herein includes the following: whether the object that made contact with the third object is either the first object or the second object; relative moving speed (acceleration) between the first/second object and the third object immediately before or when they make contact with each other in the virtual space of the game; a contact position between the first/second object and the third object in the virtual space of the game; and contact portions of the objects.

Furthermore, the game device preferably includes contact result display control means. The contact result display control means assesses the contact condition based on a predetermined assessment criterion, and controls display of a result of the assessment on the display screen.

According to this configuration, a result of the contact between the first/second object operated by a game player and the third object is assessed based on a predetermined assessment criterion. A result of the assessment is then displayed on the display screen. Accordingly, a game player can visually confirm whether a result of the game is good or not.

Additionally, the first object, which is operated by a game player, is changed into the second object in accordance with the acceleration detected by the acceleration sensor of the controller. The object contact detection means detects this change. As a result, a result of the assessment depends on whether the object operated by a game player is either the first object or the second object. For example, since the size of the first object and that of the second object are different from each other on the display screen, the larger of the first and second objects easily makes contact with the third object.

In other words, whether a result of the game is good or not depends on whether the object operated by a game player is either the first object or the second object. Whether the result of the game is good or not is displayed on the display screen. With this configuration, a game player can easily recognize that a good game result can be obtained by regulating the speed at which he/she moves the controller and by switching the first object and the second object in a timely manner. Consequently, interest and value of the game can be enhanced.

It should be noted that a variety of criteria may be applied to the aforementioned assessment criterion. For example, frequency of contact between the first/second object and the third object may be used as the assessment criterion. In this case, the contact frequency is displayed on the display screen. Accordingly, a game player can visually confirm how many times (i.e., how well) he/she could make the first/second object come in contact with the third object.

Alternatively, an effect to be exerted on the third object may be used as the assessment criterion. For example, the following settings are assumed in an action video game: a weapon of a character to be operated by a game player is the first object whereas a more powerful (more effective) weapon is the second object. In this case, when the first object makes contact with the third object, an effect to be exerted on the third object may be displayed with a numeric value or the like. On the other hand, when the second object makes contact with the third object, an effect to be exerted on the third object may be displayed with a greater numeric value or the like. Thus, a game player can visually confirm that a higher evaluation can be obtained especially by maintaining the object that he/she operates in the second object state and by making the second object come in contact with the third object. Consequently, the interest and value of the game can be enhanced.

The aforementioned game device may be realized by a computer. When a computer is herein operated as the variety of means of the game device, a control program realizing the game device using the computer and a computer-readable recording medium storing the control program are included in the scope of the present invention.

As described above, the game device of the present invention includes object change means for displaying, instead of the first object, the second object that is different from the first object when at least either of the acceleration indicated by the operation signal and the moving speed of the controller computed based on the acceleration falls in a predetermined range.

As described above, the game control method of the present invention also includes a step of displaying, instead of the first object, the second object that is different from the first object when at least either of the acceleration indicated by the operation signal and the moving speed of the controller computed based on the acceleration falls in a predetermined range.

Consequently, the present invention has an advantageous effect of realizing a video game having an even greater deal of variety and a higher amusement value than that of conventional video games.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Overview of Game System

Figure 1:
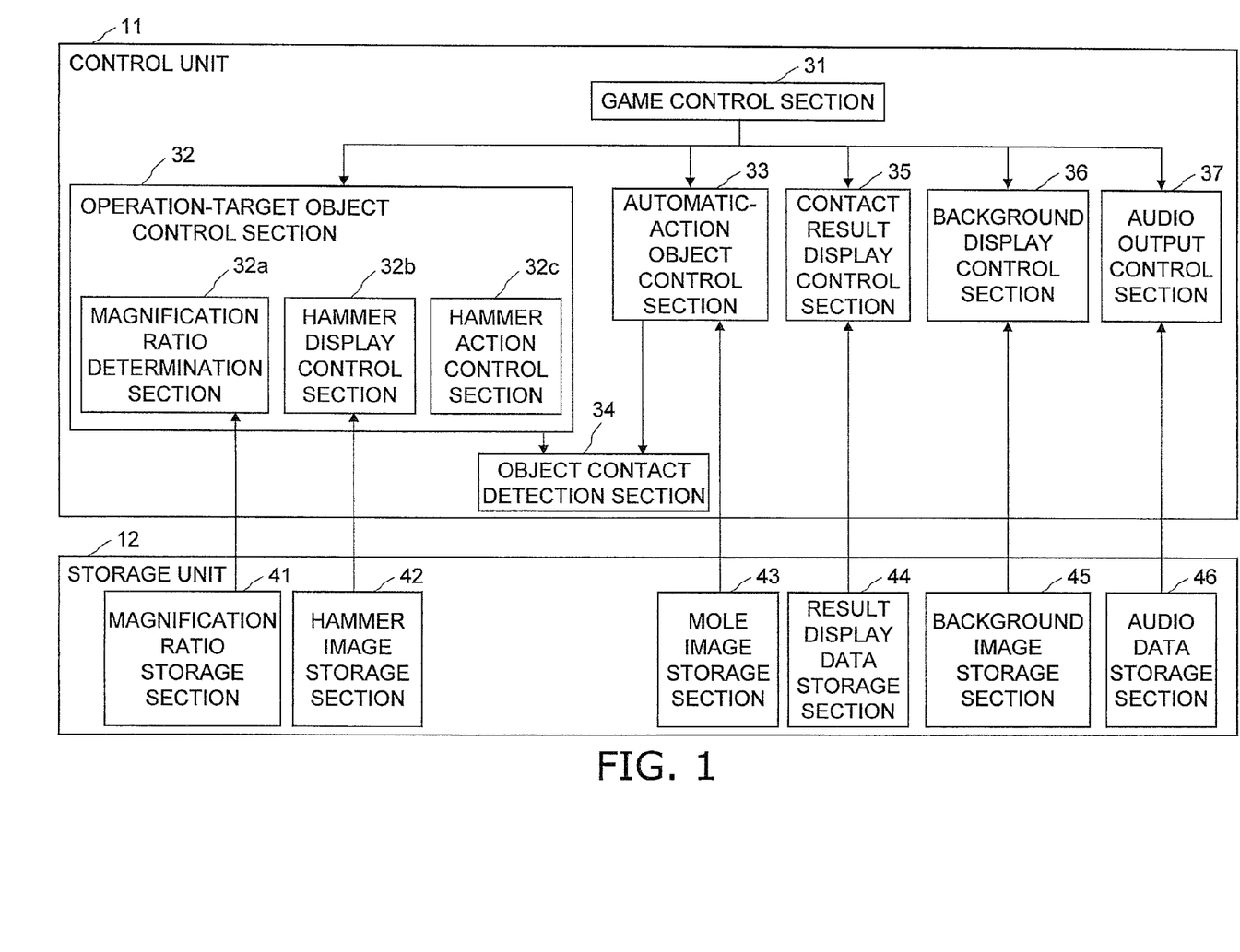
FIG. 1 is a view of a block diagram of a schematic configuration of a game system in accordance with a preferred an embodiment of the present invention.

An embodiment of the present invention will be hereinafter explained with reference to FIGS. 1 to 8. First, a schematic configuration of a game system of the present invention will be explained with reference to FIG. 1. FIG. 1 is a block diagram of a schematic configuration of a game system 1. As illustrated in FIG. 1, the game system 1 includes a game device 2, a controller 3, a display device 4, a speaker 5, and a recording medium 6.

The game device 2 executes information processing of a video game to be provided by the game system 1. Additionally, the game device 2 also controls external devices (e.g., the display device 4 and the speaker 5). The controller 3 is operated by a game player of the game system 1 and transmits an operation signal, which corresponds to a user's operation, to the game device 2. In the example of FIG. 1, only a single controller 3 is illustrated; however, a plurality of controllers 3 may be connected to the game device 2.

As illustrated in FIG. 1, the controller 3 includes an acceleration sensor 21 and an operation unit 22. The acceleration sensor 21 detects acceleration and outputs the detected acceleration as the acceleration data. In this case, the acceleration sensor 21 is preferable a tri-axial acceleration sensor to detect the magnitude of acceleration in three axial directions. Regardless, a variety of sensors, such as a piezo-resistive pressure sensor, a capacitance sensor, and a magnetic sensor, may be used as the acceleration sensor 21.

The acceleration sensor 21 is preferably embedded in the controller 3. With this structure, the acceleration data, outputted by the acceleration sensor 21, indicate acceleration of the controller 3. In other words, the acceleration sensor 21 outputs three-dimensional movement of the controller 3 to the game device 2 as the acceleration data. The game device 2 is configured to recognize the moving direction and the moving speed of the controller 3 by analyzing the acceleration data. Accordingly, the game device 2 is configured to make a game character and the like take various actions in the video game in conjunction with the moving direction and the moving speed of the controller 3 operated by a game player.

The operation unit 22 is operated by a game player during playing of the video game. Any suitable operation unit may be used as the operation unit 22 as long as it receives an input operation of a game player, generates an operation signal corresponding to the input operation, and transmits it to a control unit 11. In this case, the operation unit 22 is assumed to be composed of a plurality of operation buttons. Specifically, the controller 3 is assumed to include direction buttons for inputting up, down, right and left directions and a plurality of operation buttons (e.g., an A button and a B button) as the operation unit 22.

In addition to the aforementioned components, the controller 3 may be provided with a component for detecting the tilt of the controller 3 with respect to a display screen of the display device 4. For example, an infrared emission bar that emits infrared rays from the both ends thereof may be attached to the display screen of the display device 4. On the other hand, the controller 3 may be provided with an imaging device for imaging the infrared rays. With the structure, it is possible to detect the tilt of the controller 3 with respect to the display screen of the display device 4 based on the aspect of the imaging of the infrared rays emitted from the both ends of the infrared emission bar. Accordingly, a game player is configured to perform a detailed operation with the controller 3.

The display device 4 displays a video game to be executed by the game device 2. Any suitable display device may be used as the display device 4 as long as it is configured to display video. For example, a liquid crystal display (LCD) panel, an electro-luminescence (EL) display panel, or a cathode ray tube (CRT) display device may be used as the display device 4. The speaker 5 outputs audio used in the video game to be executed by the game device 2.

The recording medium 6 preliminarily stores a variety of data such as a game program and the game data. The recording medium 6 is preferably detachably attached to the game device 2. In the game system 1, a video game is executed when the game device 2 executes the game program read out of the recording medium 6. For example, the recording medium 6 may be composed of a read only memory (ROM) cassette, a card medium (e.g., an IC card, including a memory card, and an optical card), a semiconductor medium (e.g., a mask ROM, an EPROM, an EEPROM and a flash ROM), a disk medium (e.g., a CD-ROM, a MO, a MD, a DVD and a CD-R), a tape medium (e.g., a magnetic tape and a cassette tape), or a magnetic disk medium (e.g., a floppy (registered trademark) disk and a hard disk). When the recording medium 6 is a writable recording medium, a variety of game parameters may be stored in the recording medium 6 when a video game is suspended.

In the present embodiment, a home game console is used as an example of the game device 1. In this case, the display device 4 and the speaker 5 correspond to a home television system. However, a game system, including the game device of the present invention, is not limited to a game system including a home game console. For example, the game system is applicable to an arcade video game machine used in an amusement arcade providing a paid game service.

The game device 2 mainly includes the control unit 11, a storage unit 12, a media reader 13, an operation input interface (I/F) 14, a video output interface (I/F) 15 and an audio output interface (I/F) 16. The components are connected through a bus 17. The bus 17 mainly includes an address bus, a data bus, and a control bus.

The control unit 11 mainly controls the entire game progression based on the game program. The control unit 11 includes a central processing unit (CPU) 23, a signal processor 24, and an image processor 25. In other words, functions of the control unit 11 are realized by the CPU 23, the signal processor 24, and the image processor 25. The CPU 23, the signal processor 24, and the image processor 25 are connected to each other through the bus 17.

The CPU 23 interprets a command from a game program and executes a variety of data processing and a variety of controls. For example, the CPU 23 issues a command to the signal processor 24 for making the signal processor 24 provide the image data to the image processor 25. The signal processor 24 mainly executes computation in the three-dimensional space, computation for converting a position in the three-dimensional space to a position in the virtual three-dimensional space, light source computation, and generation and processing of the audio data and the video data. The image processor 25 mainly writes the image data to be drawn in a to-be-described RAM 27 based on the computation result and the processing result of the signal processor 24.

The image data will be hereinafter explained in detail. The image data for displaying an object taking actions in the three dimensional space will be expressed, for instance, using a polygon. When the image data are displayed with the polygon, the image data are required to include the polygon data and the texture data. The polygon data are the coordinate data of apexes forming the polygon. On the other hand, the texture data are used for setting a texture with respect to the polygon.

The texture data are composed of the texture specifying data and the texture color data. The texture specifying data are used for associating the polygon and the texture, whereas the texture color data is used for specifying a texture color. Additionally, the polygon data are required to be associated with the polygon address data, whereas the texture data are required to be associated with the texture address data. The polygon address data indicate a memory location of the polygon data, whereas the texture address data indicate a memory location of the texture data.

A polygon-type image is allowed to be displayed with the image data including the aforementioned data. Specifically, the signal processor 24 executes the coordinate conversion and the perspective projection conversion with respect to the polygon data in the three-dimensional space (i.e., the three-dimensional polygon data) specified by the polygon address data based on the displacement data and the rotational data of the screen or a point of sight. Accordingly, the three-dimensional polygon data are converted into the polygon data in the two-dimensional space (i.e., the two-dimensional polygon data). A polygon outline is thus constituted with a plurality of two-dimensional polygon data, and the texture data, specified by the texture address data, is displayed in the internal area of the polygon. As a result, an object formed by applying a texture to a polygon, that is, a character of various types is expressed.

The storage unit 12 includes a ROM (read-only memory) 26 and a RAM (random-access memory) 27. The ROM 26 stores essential data for operating the game device 2, including e.g., the program data of the BIOS (basic input output system) and the program data of the OS (operating system).

The RAM 27 functions as a working memory when the control unit 11 executes the information processing. For example, the game data and the game program used by the CPU 23, the signal processor 24, and the image processor 25 are read into the RAM 27 and are therein executed.

Based on an instruction of the control unit 11, the media reader 13 reads the game program and the like out of the recording medium 6 and transmits them to the storage unit 12. When the recording medium 6 is a writable medium, the media reader 13 may further have a function as a media writer for executing information writing processing.

In the aforementioned embodiment, the storage unit 12 includes the ROM 26 and the RAM 27, and the game data and the game program are read out of the recording medium 6 and are read into the storage unit 12 through the media reader 13. However, the present invention is not limited to this. The gas system 1 may adopt any suitable configuration as long as the data necessary for executing a video game (e.g., the game data and the game program) are available for the control unit 11.

Additionally, the game device 2 may be connectable with a predetermined communication network. In this case, the data necessary for executing a video game may be transmitted to the control unit 11 through the communication network. The communication network is not particularly limited to a specific network. For example, the communication network may be the Internet, an intranet, an extranet, a LAN, an ISDN, a VAN, a CATV communication network, a virtual private network, a telecommunication network, a mobile telecommunication network, and a satellite communication network. Moreover, the transmission medium, forming the transmission network, is not particularly limited to a specific medium. For example, a wired medium, a wireless medium, or an infrared medium is usable as the transmission medium. The wired medium includes an IEEE 1394, a USB, a power line carrier, a CATV line, a telephone line, and an ADSL line. The wireless medium includes the infrared medium (e.g., a IrDA medium and the remote-control medium), a BLUE-TOOTH™ (an open wireless protocol for exchanging data over short distances from fixed and mobile devices), an 802.11 wireless network, an HDR, a mobile telecommunication network, a satellite network, and a digital terrestrial network.

The operation input I/F 14 executes a series of processing of receiving an operational signal outputted from the controller 3 and transmitting it to the control unit 11 through the bus 17. The controller 3 and the operation input I/F 14 may be connected in the form of a wired/wireless connection.

The video output I/F 15 executes processing of outputting image data to the display device 4. The image data are herein processed by the image processor 25 in accordance with advance of a video game and are then outputted from the control unit 11. On the other hand, the audio output I/F 16 executes processing of outputting an audio signal to the speaker 5. The audio signal is herein outputted from the control unit 11 in accordance with advance of the video game.

In the present example, the control unit 11 is composed of the CPU 23 and the like, and functions of the control unit 11 are realized in a variety of programs. However, the control unit 11 may be composed of the hardware (e.g., a circuit and a chip).

In the present embodiment, execution of a video game simulating whacking of a mole in the game system 1 having the aforementioned configuration will be hereinafter exemplified. Specifically, operation of the game system 1 will be hereinafter exemplified. When the game data and the game program of a whack-a-mole game, stored in the recording medium 6, are executed by the game device 2. It should be noted that the game, executable by the game system 1, is not limited to the example.

Configuration and Function of Control Unit

Figure 2:
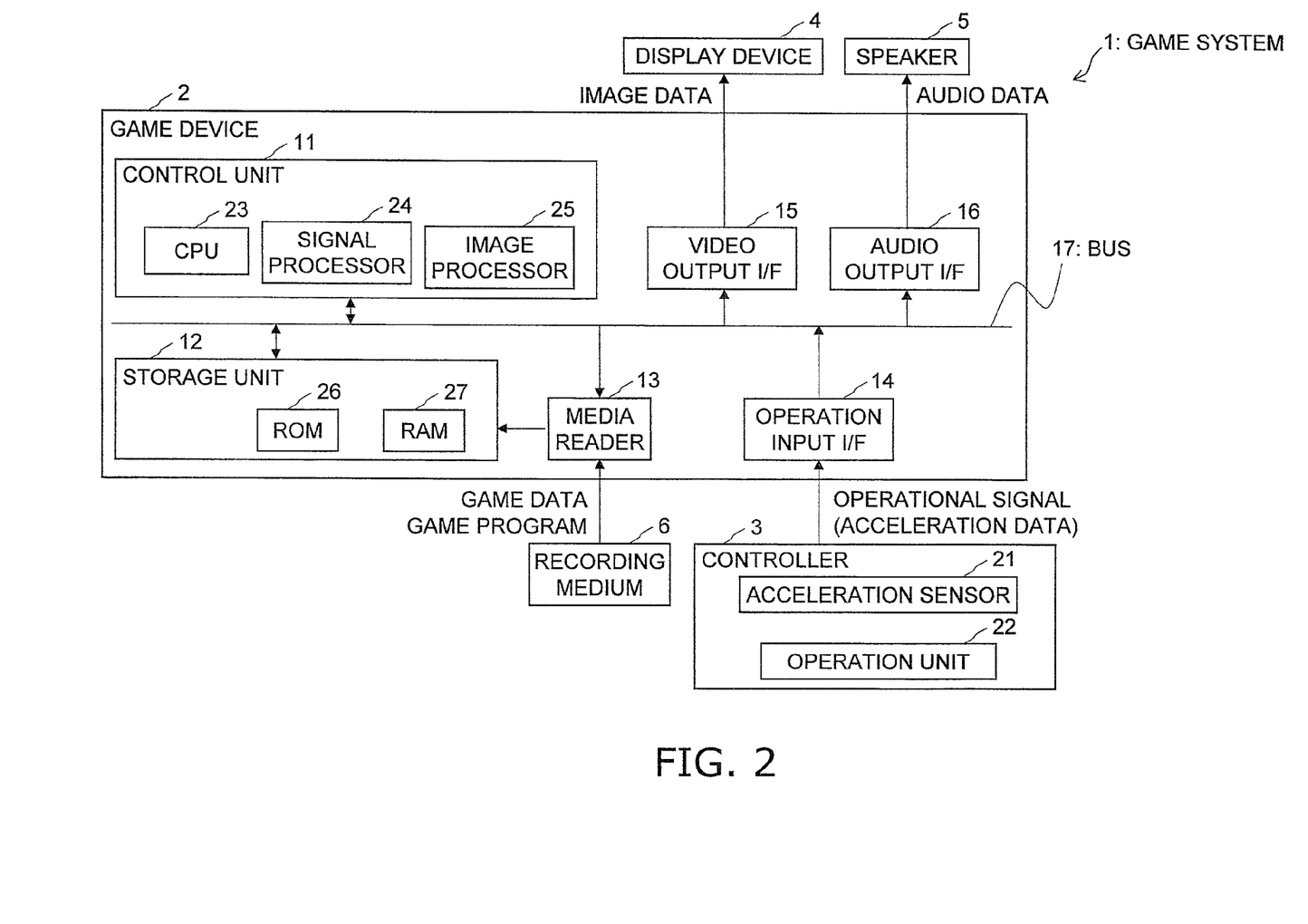
FIG. 2 is a view of a block diagram of main components of a control unit of a game device in accordance with the preferred embodiment of the present invention.

Next, a more detailed configuration and functions of the control unit 11 will be explained with reference to FIG. 2. FIG. 2 is a view of a block diagram illustrating the main components of the control unit 11 and the storage unit 12. As illustrated in FIG. 2, the control unit 11 includes a game control section 31, an operation-target object control section (i.e., object change means) 32, an automatic-action object control section (i.e., third object display control means) 33, an object contact detection section (i.e., object contact detection means) 34, a contact result display control section (i.e., contact result display control means) 35, a background display control section 36, and an audio output control section 37.

The term "object" will be hereinafter explained in detail. The object means a character expressed by a three-dimensional image displayed on the display device 4. The object is classified into two types: an operation-target object and an automatic-action object. The operation-target object is controllable by a game player of the game system 1. On the other hand, the automatic-action object cannot be controlled by a game player of the game system 1, but automatically takes actions under the control of the game program. Specifically, the operation-target object moves on the display device 4 in accordance with movement of the controller 3. On the other hand, the automatic-action object takes a predetermined or random action on the display device 4 under the control of the game program.

In the whack-a-mole video game, the operation-target object is specifically a hammer for whacking a mole and corresponds to first and second objects. On the other hand, the automatic-action object is a mole, and corresponds to a third object. In short, the moles, which are displayed on the display device 4, automatically take actions under the control of the game program. The game player is allowed to move the hammer and whack the mole on the display device 4 by moving the controller 3. Additionally, an image and an action of the hammer are changed in accordance with movement acceleration detected by the controller 3 when a game player moves the controller 3.

As illustrated in FIG. 2, the storage unit 12 includes a magnification ratio storage section 41, a hammer image storage section 42, a mole image storage section 43, a result display data storage section 44, an assessment criterion storage section, a background image storage section 45 and an audio data storage section 46. Additionally, the components of the control unit 11 operate using the data stored in the storage unit 12. First, a variety of data that are stored in the storage unit 12 will be hereinafter explained.

The magnification ratio storage section 41 stores data indicating a relation among acceleration detected by the controller 3 and then recognized by the game device 2, enlargement magnification ratio of the hammer image in conjunction with the acceleration, and speed magnification ratio of the moving speed of the hammer in conjunction with the acceleration. In other words, the enlargement magnification ratio and the speed magnification ratio of the hammer in conjunction with the acceleration are computed by referring to the magnification ratio storage section 41.

The hammer image storage section 42 stores the display data for displaying the hammer image on the display device 4. Specifically, the hammer image storage section 42 stores the polygon data, the texture data, and the like of the hammer image. Similarly, the mole image storage section 43 stores the display data for displaying the mole image on the display device 4. Specifically, the mole image storage section 43 stores the polygon data, the texture data, and the like of the mole image.

The result display data storage section 44 stores the display data for displaying a game result of the whack-a-mole game and the number of whacked moles at a predetermined point of time in the game on the display device 4. The background image storage section 45 stores background images including, e.g., a stage from which the mole appears and a single or plurality of holes. The audio data storage section 46 stores the audio data such as the background music and the sound effects of the whack-a-mole game.

Next, the components of the control unit 11 will be hereinafter explained. The game control section 31 transmits an instruction to each of the components based on the game program, and controls the advancement of the entire game. Additionally, the game control section 31 analyzes an operational signal transmitted from the controller 3 and transmits a predetermined instruction to each of the components in response to the operational signal. For example, the game control section 31 transmits the acceleration data that are included in the operational signal transmitted from the controller 3 to the operation-target object control section 32. Accordingly, the hammer (i.e., the operation-target object) takes an action in accordance with the acceleration data on the display device 4.

The operation-target object control section 32 controls display and actions of the operation-target object based on the acceleration data transmitted from the game control section 31. The control is executed by a magnification ratio determination section 32a, a hammer display control section 32b, and a hammer action control section 32c, all of which are included in the operation-target object control section 32.

When receiving the acceleration data from the game control section 31, the magnification ratio determination section 32a refers to the magnification ratio storage section 41 and determines the enlargement magnification ratio and the speed magnification ratio of the hammer image in response to the received acceleration. The magnification ratio determination section 32a subsequently transmits a result of the determination to the hammer display control section 32b and the hammer action control section 32c.

The hammer display control section 32b reads the hammer image data out of the hammer image storage section 42 based on the instruction of the game control section 31. The hammer display control section 32b subsequently causes the display device 4 to display the read-out image data. Additionally, the hammer display control section 32b executes processing of enlarging the hammer image to be displayed on the display device 4 based on the determination result received from the magnification ratio determination section 32a, and causes the display device 4 to display the enlarged hammer image.

The hammer action control section 32c continuously moves the hammer image displayed on the display device 4 based on the acceleration data received from the game control section 31. Specifically, the hammer action control section 32c determines the moving speed, the disposition, and the moving direction of the hammer in the virtual space of the video game based on the acceleration data of three axial directions. The hammer action control section 32c continuously moves the hammer image on the display device 4 in accordance with the determined moving speed, disposition, and moving direction, and changes a positional coordinate of the hammer in the virtual space of the video game. When the angle of the hammer is changed on the display device 4, the hammer display control section 32b causes the display device 4 to display a hammer image associated with the angle.

For example, the moving speed of the hammer image displayed on the display device 4 may be computed by multiplying velocity, which is computed by the integration of the acceleration, by a predetermined correction coefficient. Alternatively, the moving speed of the hammer image may be determined based on the acceleration value without computing the velocity from the acceleration. For example, the moving speed of the hammer image may computed by multiplying the acceleration value by a predetermined correction coefficient. Additionally, the hammer action control section 32c changes the moving speed of the hammer image to be displayed on the display device 4 based on the determination result received from the magnification ratio determination section 32a.

The automatic-action object control section 33 not only causes the display device 4 to display the automatic-action object, i.e., the mole image, based on the instruction from the game control section 31, but also executes a variety of processing, e.g., moving, changing, and removing the mole image on the display device 4.

Specifically, the automatic-action object control section 33 causes the display device 4 to display a series of images showing the mole or moles moving out of a hole or holes at a predetermined or random timing in a predetermined positional coordinate or coordinates in the virtual space of the video game based on the instruction from the game control section 31. Additionally, the automatic-action object control section 33 causes the display device 4 to display the mole image or images for a predetermined period of time, subsequently causes the display device 4 to display a series of images showing that the mole or moles move into the hole or holes, and causes the display device 4 to remove the mole image or images from the screen. Moreover, when the object contact detection section 34 determines that the hammer makes contact with a mole in the virtual space of the video game, the automatic-action object control section 33 causes the display device 4 to display an image showing that a mole is whacked, and causes the display device 4 to display a series of images showing that the whacked mole moves into the hole when a predetermined period of time elapses.

Although not illustrated in FIG. 2, the storage unit 12 stores the aforementioned types of mole images. The automatic-action object control section 33 is herein assumed to read an appropriate mole image out of the storage unit 12 and to cause the display device 4 to display it.

The object contact detection section 34 detects a contact condition of the operation-target object and the automatic-action object in the virtual space of the video game. The term "contact condition" herein means size, speed, and the like of the operation-target object when it makes contact with the automatic-action object. Note the size, the speed, and the like of the operation-target object are obtained from the magnification ratio determination section 32a.

In short, the object contact detection section 34 detects that the hammer hits a mole in the whack-a-mole game, and detect the size of the hammer when it hits the mole, and the speed of the hammer immediately before it hits the mole. Detection of a contact of the hammer and the mole will be hereinafter exemplified.

First, the mole image or images and the hammer image are herein shown to have contactable areas, respectively. For example, the entire hammer image is not necessarily set to be the contactable area. For instance, a handle of the hammer image is not set to be the contactable area. The part of the hammer image that is set to be the contactable area thereof is herein referred to as a striking surface. On the other hand, each entire mole image is set to be a contactable area. The contactable area of each mole image is set to be effective only in a period of time when the mole image moves out of a hole until it moves into the hole. However, the contactable area of each mole image is set to be ineffective, for instance, in a period of time when a the mole image is whacked by the hammer image until it moves into a hole, or in a period of time until the mole moves out of the hole.

In short, the object contact detection section 34 detects whether or not the mole image and the striking surface of the hammer image make contact with each other in the virtual space of the video game in a period of time since the mole image moves out of the hole until it moves into the hole.

The whack-a-mole game is herein assumed to be played in the virtual three dimensional space of the game. Therefore, the object contact detection section 34 determines that a mole image and the hammer image make contact with each other when a three dimensional coordinate of the striking surface of the hammer image and a three dimensional coordinate set for each of the moles are matched. In this case, the three dimensional coordinate set for each of the moles is obtainable from the automatic-action object control section 33, whereas the three dimensional coordinate of the striking surface of the hammer is obtainable from the operation-target object control section 32.

The contact result display control section 35 assesses the contact condition of each mole image and the hammer image in the virtual space of the video game, detected by the object contact detection section 34, based on a predetermined assessment criterion. The contact result display control section 35 displays a result of the assessment on the display device 4 using the result display data stored in the result display data storage section 44.

In this case, the predetermined assessment criterion is assumed to be the frequency at which the hammer image and a mole image make contact with each other. In short, the contact result display control section 35 displays the sum of the moles whacked by the hammer on the display device 4. Accordingly, a game player can visually confirm the number of moles that the game player whacked with the hammer image.

The contact result display control section 35 displays a result of the whack-a-mole game (i.e., the sum of the moles that a game player whacked with the hammer image in the game) on the display device 4 as a game result display screen when the whack-a-mole game is over. With this configuration, a game player can recognize the game result. In the present embodiment, the contact result display control section 35 has both of a function of causing the number of the moles that a game player whacked during the game and a function of causing the number of the moles that a game player whacked after the game is over. However, the contact result display control section 35 may have only either of the functions.

Additionally, the predetermined assessment criterion may be suitably changed in accordance with a specification of the game and the like. For example, the automatic-action object control section 33 may cause the display device 4 to display moles of three speed levels (i.e., fast, normal, and slow). When a game player whacks a fast mole with the hammer, the automatic-action object control section 33 may cause the display device 4 to display a higher evaluation (e.g., score).

The background display control section 36 reads a predetermined background image, which is associated with a progress of the game program, out of the background image storage section 45, and causes the display device 4 to display it based on the instruction from the game control section 31. Specifically, the background display control section 36 causes the display device 4 to display a stage including holes in and out of which the moles move during execution of the whack-a-mole game. Additionally, the background display control section 36 causes the display device 4 to display a timer showing a time limit of the whack-a-mole game as a background image. In short, a time limit is set for the whack-a-mole game. In the game, game players compete based on the number of the moles that they whack until the time limit elapses from the start of the game.

The audio output control section 37 causes the speaker 5 to output audio data (e.g., a background music and a sound effect) read out of the audio data storage section 46 at a predetermined timing based on the instruction from the game control section 31.

Example Operation of Whack-A-Mole Game

Figure 3:
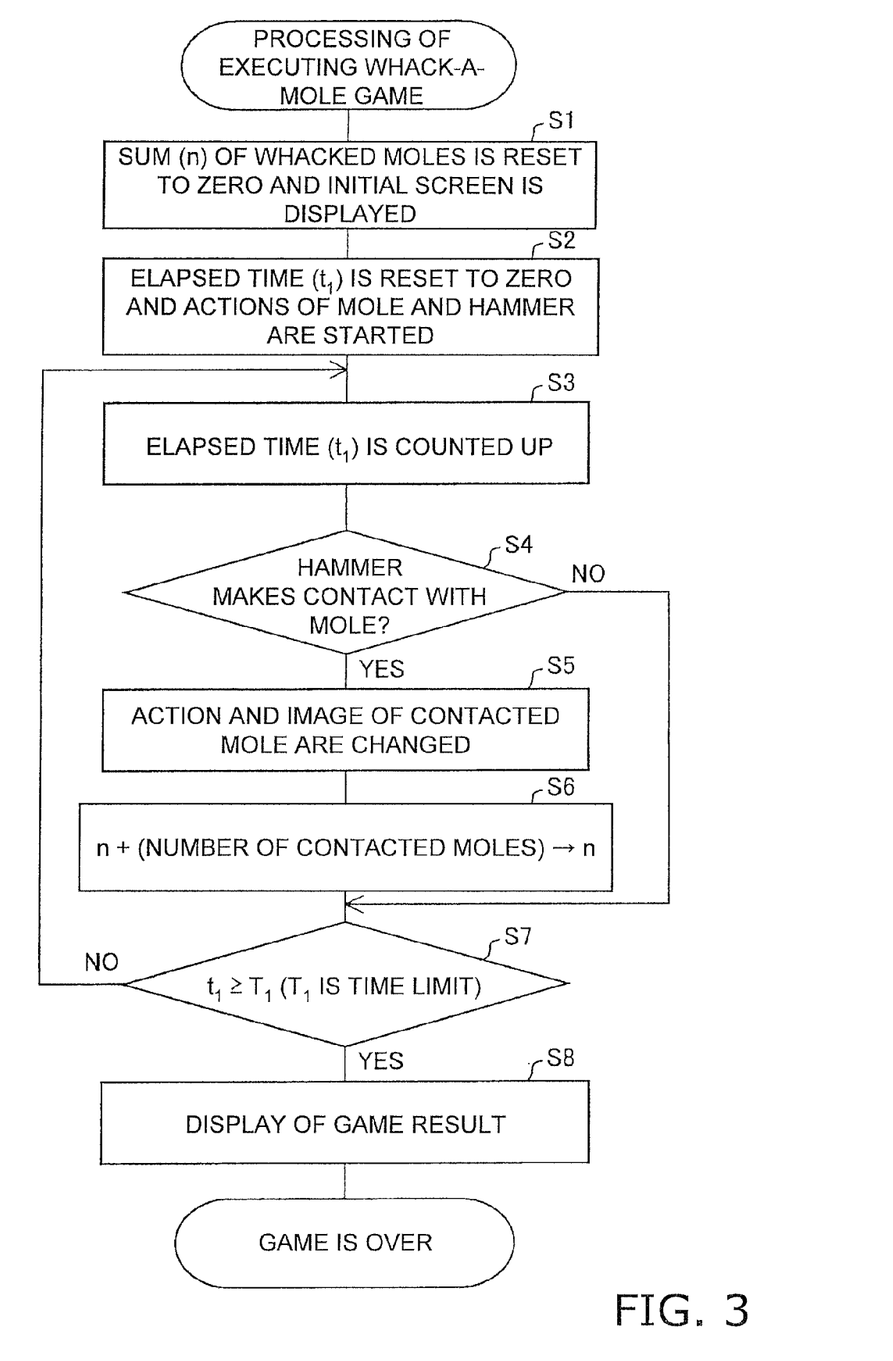
FIG. 3 is a view of a flowchart showing an example of a process to execute a whack-a-mole game in accordance with the preferred embodiment of the present invention.

A flow of processing, executed by the control unit 11 when a whack-a-mole game is executed in the game system 1, will be hereinafter explained with reference to FIGS. 1 to 3. FIG. 3 is a view of a flowchart illustrating an example of a process to execute a whack-a-mole game.

The game control section 31 starts executing the whack-a-mole game when an operation signal from the controller 3 includes an instruction to start the game. Start of the game is instructed by an input through an operation button of the operation unit 22. First, the game control section 31 instructs the contact result display control section 35 to reset the sum (n) of the moles that a game player whacked to zero. Simultaneously, the game control section 31 instructs the background display control section 36 and the operation-target object control section 32 to display an initial screen of the video game on the display device 4 (Step S1).

Figure 4:
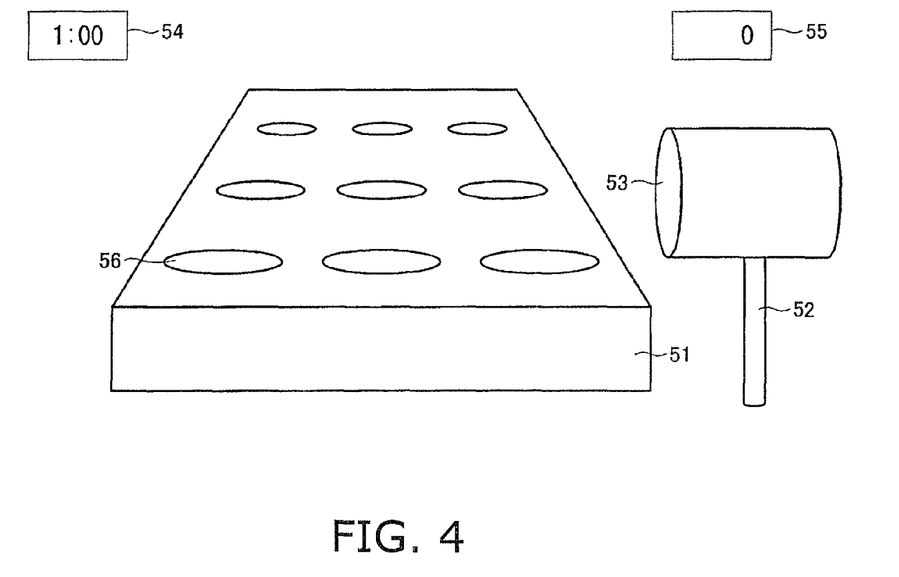
FIG. 4 is a view of a diagram of an example of an initial screen of the whack-a-mole game.

Now, the initial screen, displayed on the display device 4 in Step S1, will be explained with reference to FIGS. 1 to 4. FIG. 4 shows an example of the initial screen of the whack-a-mole game. As illustrated in FIG. 4, images of a stage 51, a hammer 52, a timer 54, and a counter 55 are displayed on the initial screen. The stage 51 herein includes nine (3×3) holes 56; however, it should be apparent from this disclosure that the number can vary. Additionally, the hammer 52 includes a striking surface 53, set to be contactable with a mole.

In short, the whack-a-mole game is a type of game that a game player using the hammer 52 whacks moles moving out of the holes 56 of the stage 51. The number of whacked moles is displayed on the counter 55. When the whack-a-mole game is started, time, which is displayed on the timer 54, is counted down. When the time that is displayed on the timer 54 is counted down to zero, the game is over.

Next, the game control section 31 resets elapsed time t1 from the start of the game to zero. Simultaneously, the game control section 31 instructs the operation-target object control section 32 and the automatic-action object control section 33 to start actions of the hammer 52 and the moles (Step S2).

Next, the game control section 31 counts up the elapsed time t1 (Step S3). In short, the game control section 31 has a function of measuring time, and counts up the elapsed time t1 for every predetermined time interval. Additionally, the game control section 31 instructs the background display control section 36 to display time on the timer 54 in accordance with the elapsed time t1.

With this configuration, the hammer 52, which is displayed on the display device 4, moves in accordance with the movement of the controller 3, whereas a mole moves out of the hole 56 at a predetermined or random timing. Also, the time, which is displayed on the timer 54, is counted down in accordance with the elapsed time t1.

Next, the game control section 31 instructs the object contact detection section 34 to confirm whether or not the striking surface 53 of the hammer 52 and a mole made contact with each other (Step S4). When the striking surface 53 of the hammer 52 makes contact with the mole (Yes in Step S4), the game control section 31 instructs the automatic-action object control section 33 to change an action and an image of the mole that made contact with the hammer 52 (Step S5).

Specifically, the automatic-action object control section 33 causes an image showing that the mole is whacked by the hammer 52 based on the instruction from the game control section 31, and subsequently displays a series of images showing that the wracked mole moves into the hole 56. The automatic-action object control section 33 then causes the mole that has moved into the hole 56 to move out of the hole 56 again after a predetermined or random period of time elapses.

The game control section 31 instructs the contact result display control section 35 to sum up the sum (n) of the moles that a game player has already whacked and the number of moles that made contact with the hammer 52 (Step S6). The contact result display control section 35 subsequently displays the sum (n) of the moles that a game player whacked on the counter 55. Note the order of Steps 5 and 6 may be interchangeable. Alternatively, the Steps 5 and 6 may be simultaneously executed.

Figure 5:
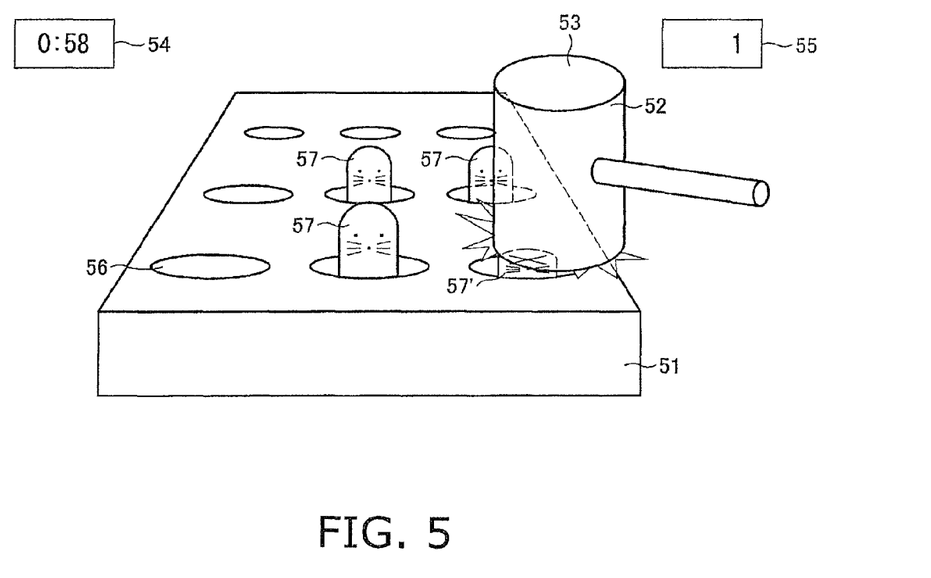
FIG. 5 is a view of a diagram of an example of a display screen to be displayed while the whack-a-mole game is played.

A display screen, displayed on the display device 4 during the game, will be explained with reference to FIG. 5. FIG. 5 is an example display screen to be displayed during the whack-a-mole game. In the example, four moles 57 are moving out of the holes 56 and one of them is being whacked by the hammer 52.

The moles 57 repeatedly move in and out of the holes 56 at predetermined or random timings. When the striking surface 53 of the hammer 52 makes contact with one of the moles 57 while the moles 57 are moving out of the holes 56, a mole 57', which is an image showing that the mole 57 is whacked, will be displayed as illustrated in the figure. The whacked mole 57 moves into the hole 56, and moves out of the identical hole 56 again after a predetermined or random period of time elapses. The automatic-action object control section 33 herein controls the timing when the whacked mole 57 moves out of the hole 56 again.

When the object contact detection section 34 could not detect that the hammer 52 made contact with the mole 57 in Step S4, or after the sum (n) of the moles 57 that a game player whacked and the number of moles 57 that made contact with the hammer 52 were summed up in Step S6, the game control section 31 confirms whether or not the elapsed time t1 from the start of the game exceeds the predetermined time limit T1 (Step S7). The time limit T1 may be suitably set in accordance with a specification of the whack-a-mole game. In this example, the time limit T1 is a minute.

When the elapsed time t1 has not exceeded the time limit T1 yet (No in Step S7), the processing goes back to Step S3 and the game control section 31 counts up the elapsed time t1. Subsequently, the game control section 31 confirms whether or not the hammer 52 made contact with the mole 57 (Step S4). On the other hand, when the elapsed time t1 exceeds the time limit T1 (Yes in Step S7), the game control section 31 instructs the contact result display control section 35 to display a game result, that is, the sum of the moles during the game, on the display device 4 (Step S8).

Example of Object Image Change Processing

Figure 6:
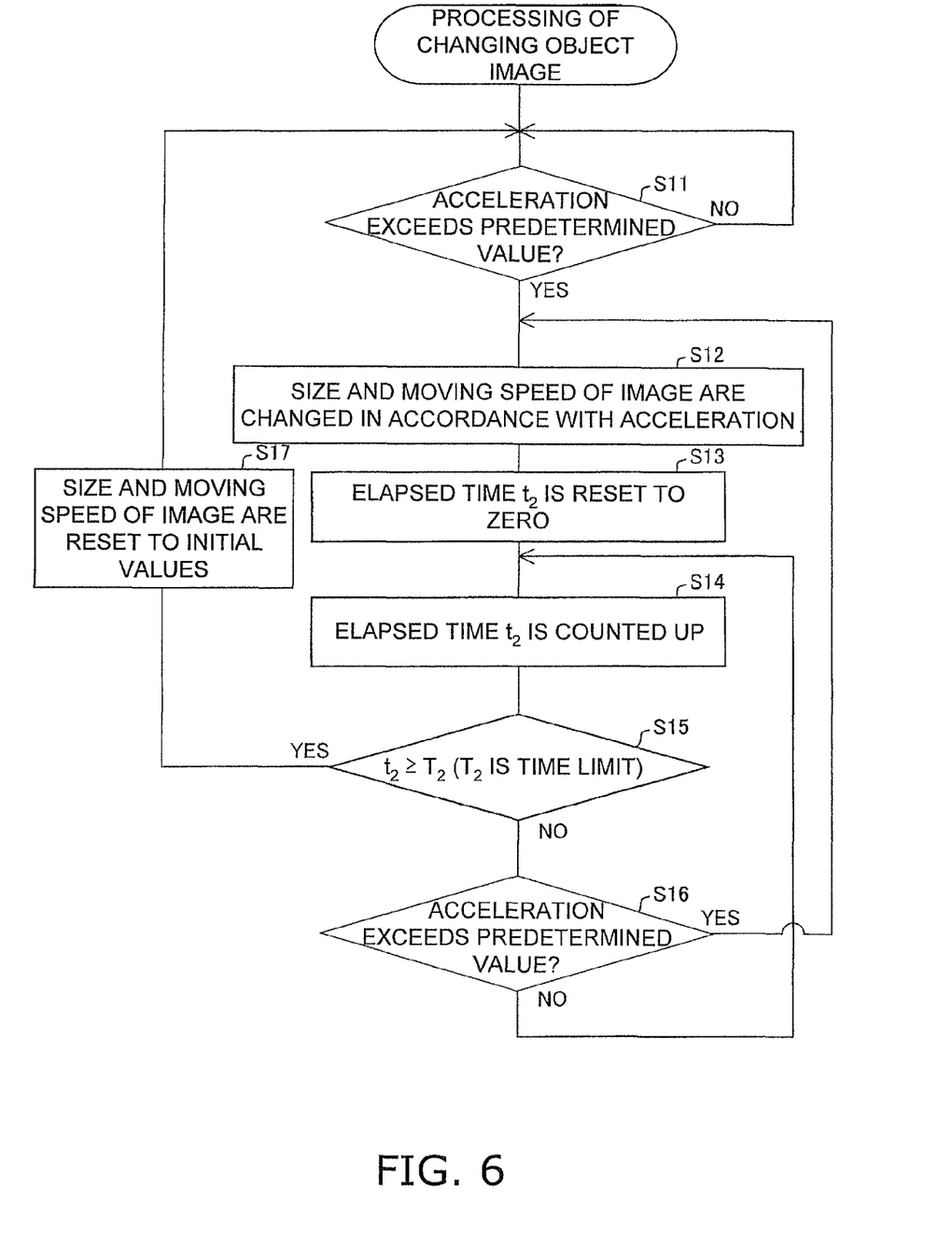
FIG. 6 is a view of a flowchart showing an example of a process to change an object image in the whack-a-mole game.

An important matter of the present invention, that is, object image change processing, will be hereinafter explained with reference to FIGS. 1, 2, and 6 to 8. FIG. 6 is a view of a flowchart illustrating an example of the object image change processing. The object image change processing is a type of processing executed by the operation-target object control section 32 during the whack-a-mole game execution processing. Specifically, the object image change processing is executed to enlarge the hammer image in accordance with acceleration detected by the acceleration sensor 21 of the controller 3.

First, the magnification determination section 32a of the operation-target object control section 32 refers to the magnification storage section 41, and determines whether or not acceleration of the hammer 52 that is transmitted from the game control section 31 exceeds a predetermined value (Step S11). Then, when the magnification determination section 32a determines that the acceleration that exceeds the predetermined value was inputted (Yes in Step S11), it instructs the hammer display control section 32b and the hammer action control section 32c to change the size and the moving speed of the hammer image to be displayed on the display device 4 in accordance with the acceleration (Step S12).

Next, the magnification determination section 32a resets elapsed time t2 after change of the image to zero (Step S13), and starts counting up the elapsed time t2 (Step S14). After starting the count, the magnification determination section 32a monitors whether or not the elapsed time t2 exceeds time limit T2 (Step S15). When the magnification determination section 32a determined that the elapsed time t2 has exceeded the time limit T2 (Yes in Step S15), it instructs the hammer display control section 32b and the hammer action control section 32c to restore the size and the moving speed of the hammer image to the initial values (Step S17). Note the initial values mean the size and the moving speed of the hammer image of a static state at the start of the whack-a-mole game.

With this configuration, the hammer 52 is enlarged and is subsequently restored to the original size after the predetermined period of time T2 elapses. The predetermined period of time T2 may be suitably set in accordance with a specification of the whack-a-mole game. In the present embodiment, the predetermined period of time T2 is assumed to be 0.5 second.

After the moving speed is restored to the initial value, the processing goes back to Step S11 again and the magnification determination section 32a stands by until the acceleration exceeds the predetermined value and is detected. According to the aforementioned whack-a-mole game, when the acceleration exceeds the predetermined value and is inputted into the game device 2 during execution of the game, the hammer image to be displayed on the display device 4 is set to be enlarged only for the time period T2. With this configuration, the whack-a-mole game will be a game having a great deal of variety and a high level of amusement value.

On the other hand, when the magnification determination section 32a determined that the elapsed time t2 is less than the time limit T2 (No in Step S15), it refers to the magnification storage section 41 and determines whether or not acceleration that is transmitted from the game control section 31 exceeds a predetermined value (Step S16). When the magnification determination section 32a determines that the acceleration exceeded the predetermined value and was inputted (Yes in Step S16), the processing proceeds to Step S12, and the magnification determination section 32a causes the hammer display control section 32b and the hammer action control section 32c to change the size and the moving speed of the hammer image to be displayed on the display device 4 in accordance with the acceleration. On the other hand, when the magnification determination section 32a does not determine that the acceleration exceeded the predetermined value and was inputted (No in Step S16), the processing goes back to Step S14 and the magnification determination section 32a counts up the elapsed time t2.

Thus, in the whack-a-mole game, when acceleration exceeds the predetermined value and is detected under the condition that the size and the moving speed of the hammer image are changed, the size and the moving speed of the hammer image are changed in accordance with the acceleration. When the size and the moving speed of the hammer image are changed, the elapsed time t2 is subsequently reset.

Therefore, a game player can maintain a state in which the hammer image is enlarged by quickly and continuously moving the controller 3. Moreover, a game player can also further enlarge the size of the already-enlarged hammer image by even more quickly moving the controller 3. Thus, a game player gets absorbed in a moving operation of the controller 3 to maintain a state of the hammer image of the enlarged size or for further enlarging the size of the hammer image.

Figure 7:
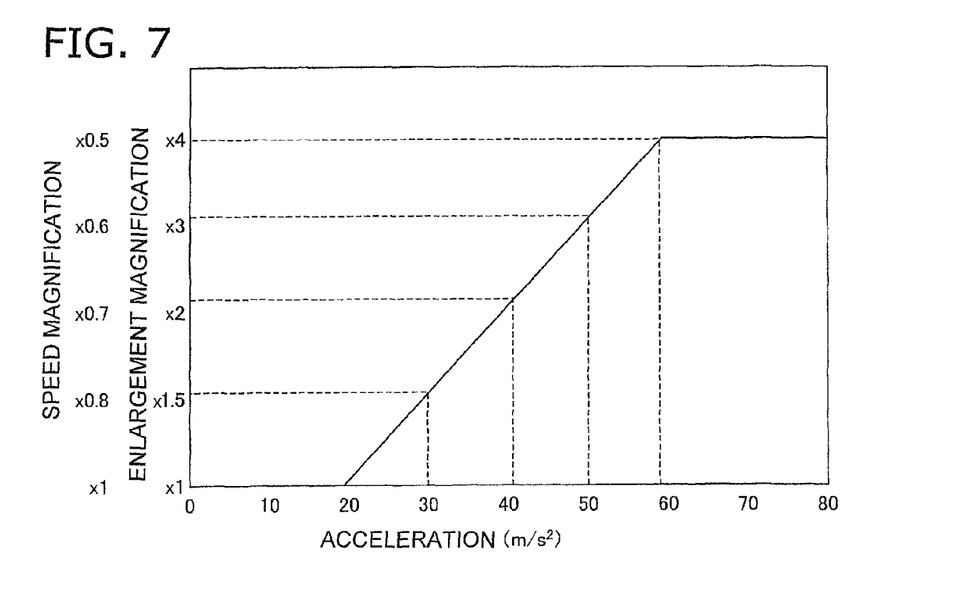
FIG. 7 is a view of a chart illustrating an example of a relation among acceleration, an enlargement magnification ratio of an image of an operation-target object, and a speed magnification ratio thereof according to the preferred embodiment of the present invention.

A specific example of changing the operation-target object in accordance with acceleration will be hereinafter explained with reference to FIGS. 1, 2, and 7. FIG. 7 is a diagram for showing a relation among acceleration, enlargement magnification, and speed magnification of the image of the operation-target object. In the present embodiment, the magnification storage section 41 preferably stores data shown in FIG. 7 and the magnification determination section 32a refers to the data and determines the enlargement magnification and the speed magnification.

The term "enlargement magnification" herein means magnification used for expanding the hammer image at equal ratios in the directions of the three axes X, Y, and Z of the virtual three dimensional space of the game. In other words, the hammer image is expanded while ratio of length, width, and depth of the hammer image is maintained. Consequently, the hammer image is enlarged while keeping its original shape.

In the chart illustrated in FIG. 7, the enlargement magnification of the hammer image is increased in proportion to the acceleration. With use of the illustrated chart, the magnification determination section 32a can determine the enlargement magnification of the hammer image in accordance with a value of the acceleration. For example, when the magnification determination section 32a receives an acceleration of less than 20 (m/s$^2$) (note unit of the acceleration will be hereinafter omitted) from the game control section 31, it reads out the enlargement magnification "1" of the hammer from the illustrated chart and does not give any instructions for changing the hammer image size.

With reference to the illustrated chart, the hammer image is enlarged at a magnification of 1.5 times when the acceleration is 30. The hammer image is enlarged at a magnification of 2.0 times when the acceleration is 40. The hammer image is enlarged at a magnification of 3.0 times when the acceleration is 50. As illustrated in FIG. 7, the hammer image is enlarged at a magnification of 4.0 times when the acceleration is equal to or greater than 60. Furthermore, even when the detected acceleration is equal to or greater than 60, the enlargement magnification of the hammer does not exceed 4.0.

As described above, the hammer image is herein assumed to be enlarged by expanding it at a predetermined enlargement magnification (expansion ratio), while the ratio of length, width and depth of the image is maintained.

As should be apparent from this disclosure, the relation between the acceleration and the enlargement magnification, illustrated in the figure, is just an example. The relation is not limited to this, and may be suitably set in accordance with a specification of the game. For example, when the acceleration is 30-40, the hammer image may be enlarged at a magnification of 1.5 times. Furthermore, when the acceleration is 40-50, the hammer image may be enlarged at a magnification of 2.0 times. Thus, the enlargement and magnification may be set to be changed in a stepwise manner in accordance with a range of the acceleration. When the enlargement and magnification are changed in a stepwise manner, the processing load on the game device 2 can be further reduced than in a case in which the enlargement magnification is changed in a continuous manner in accordance with the acceleration. Moreover, the image may be set to be unlimitedly enlarged in accordance with the acceleration without setting an upper limit for the enlargement and magnification. In the illustrated example, the image is set to be enlarged in accordance with the acceleration. However, the image may be set to be reduced in accordance with the acceleration.

The chart of FIG. 7 also shows the speed magnification in accordance with the acceleration. As illustrated in the figure, the speed magnification of the hammer is reduced in proportion to the acceleration. With use of the illustrated chart, the magnification determination section 32a can determine the speed magnification of the hammer in accordance with a value of the acceleration.

For example, when the acceleration that the magnification determination section 32a received from the game control section 31 is less than 20, the magnification determination section 32a refers to the illustrated chart and reads that the corresponding speed magnification of the hammer is "1.0." Accordingly, the magnification determination section 32a does not give any instructions for changing the moving speed of the hammer. Additionally, in the illustrated chart, when the acceleration is 30, 40, and 50, the corresponding speed magnification is 0.8, 0.7 and 0.6, respectively. When the acceleration is equal to or greater than 60, the corresponding speed magnification is 0.5. As should be apparent from this disclosure, the relation between the acceleration and the speed magnification, illustrated in the figure, is just an example. Similarly to the relation between the acceleration and the enlargement magnification, the relation between the acceleration and the speed magnification may be suitably set in accordance with a specification of the game. For example, the moving speed may be set to be increased in accordance with enlargement of the image. Alternatively, the moving speed may be set to be increased in accordance with the reduction of the image. Alternatively, the speed magnification may be set to be changed in a stepwise manner in accordance with a range of the acceleration.

The data that are used when the magnification determination section 32a determines the magnification are not necessarily limited to the aforementioned example as long as it at least shows the relation between the acceleration and the enlargement magnification. For example, the magnification storage section 41 preliminarily stores a correspondence chart or an equation, which indicates the relation between the acceleration and the enlargement magnification. The enlargement magnification may be set to be specified based on the data of the above format. When the moving speed of the hammer is not required to be changed, the magnification storage section 41 is not required to store preliminarily the data indicating the relation between the acceleration and the speed magnification.

Moreover, in the aforementioned example, the size and the moving speed of the hammer are changed based on the data indicating the relation between the acceleration and the enlargement magnification (or the speed magnification). However, the size and the moving speed of the hammer may be changed based not on the magnification but on the data indicating the relation between the acceleration and a numeric value indicating the size or the moving speed of the hammer.

Thus, the magnification determination section 32a determines the enlargement magnification and the speed magnification in accordance with the acceleration, and transmits a result of the determination, i.e., the enlargement magnification and the speed magnification, to the hammer display control section 32b and the hammer action control section 32c. The hammer display control section 32b performs computation of the enlargement based on the enlargement magnification that it receives, and causes the display device 4 to display an enlarged hammer image. On the other hand, the hammer action control section 32c changes the moving speed of the hammer image into the speed obtained by multiplying the moving speed computed based on the acceleration data by the speed magnification in a period of time until the size of the hammer image is restored to its original size.

With this configuration, the size of the hammer image to be displayed on the display device 4 is changed in accordance with the acceleration detected by the controller 3. When the hammer image is enlarged, the speed of the hammer image moving on the display device 4 becomes slower than the moving speed of the controller 3. In other words, even when the controller 3 is moved at the same speed as before the hammer image is enlarged, the speed of the hammer moving on the display device 4 becomes slower. This enables a game player to feel that the hammer becomes larger and heavier than before.

Figure 8:
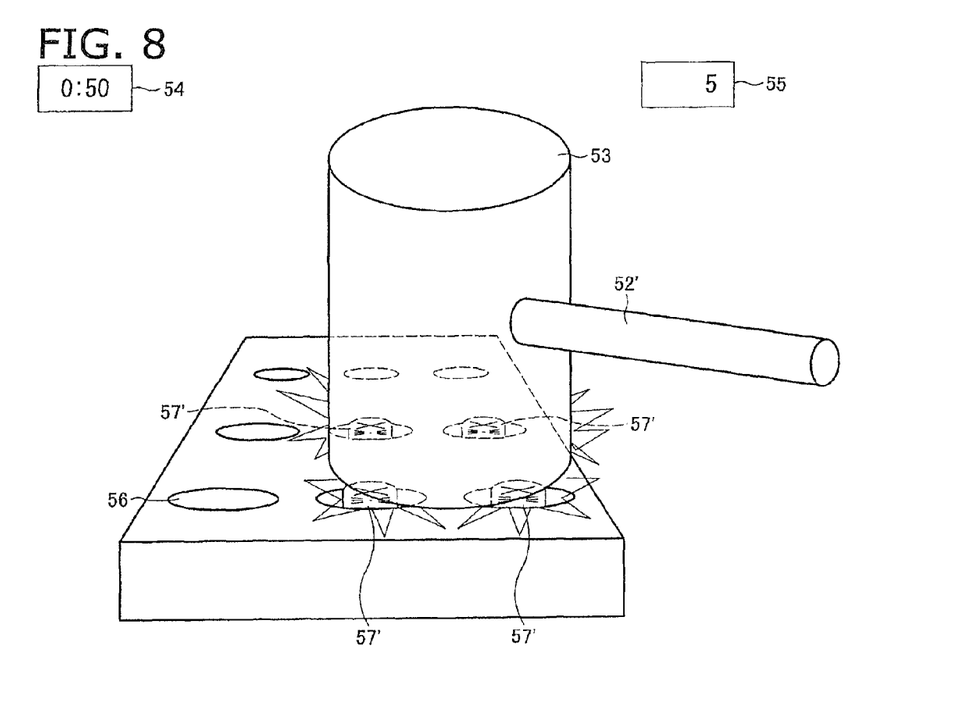
FIG. 8 is a view of a diagram showing an example display screen to be displayed while the whack-a-mole game is played, and illustrating a condition in which a hammer image is enlarged.

In the whack-a-mole game of the present embodiment, when the hammer image is enlarged, not only the moving speed of the hammer is changed but also a variety of effects are set to be produced. The effects will be hereinafter explained with reference to FIGS. 1, 2, and 8. FIG. 8 is a view of a diagram illustrating an example of a display screen to be displayed during playing of the whack-a-mole game. Specifically, FIG. 8 illustrates a condition in which the hammer 52', i.e., the enlarged hammer 52, is being displayed.

As illustrated in the figure, the striking surface 53, i.e., the contactable area of the hammer 52, is enlarged in accordance with the enlargement of the hammer 52. Accordingly, the contact area of the hammer 52' with the mole 57 becomes larger than that of the hammer 52. A game player can thereby whack a plurality of moles 57 with the hammer 52' at one time. Consequently, a game player can whack more moles 57 within the time limit. For example, when the hammer 52 is enlarged as illustrated in FIG. 8, a game player can even whack four moles 57 at a time.

When the hammer is being enlarged, the game control section 31 instructs the audio output control section 37 to change a sound effect to be outputted from the speaker 5 in accordance with the size of the hammer. This enables a game player to feel that the hammer becomes larger and the hammer is powered up.

The automatic-action object control section 33 changes a reaction of the mole in accordance with a contact condition between the mole and the hammer, which is detected by the object contact detection section 34. Specifically, the automatic-action object control section 33 changes an action of the mole whacked by the hammer in accordance with the size of the hammer to be displayed for enabling a game player to recognize that the impact on the mole changes in accordance with the size of the hammer to be displayed.

Specifically, the automatic-action object control section 33 reduces a period of time when the mole is whacked until it moves into the hole in accordance with the size of the hammer. Thus, the faster the mole moves into the hole, the shorter a period of time when the mole moves into the hole until it moves out of the identical hole next time. With this configuration, an increasing number of the moles moves out of the holes within the time limit. Consequently, a game player has more chances of whacking the moles within the time limit by moving the controller 3 faster.

In the whack-a-mole game of the present embodiment, however, when the hammer is enlarged, the moving speed of the hammer is accordingly set to be slower. Even if a game player swings the controller 3 in a slapdash manner, he/she cannot whack a lot of moles. Therefore, a game player is required to devise the speed and the timing of moving the controller 3 for whacking more moles. A game player thus further gets absorbed in the game.

Moreover, the automatic-action object control section 33 may be set to deform or change the whacked mole image in accordance with the size of the hammer image. For example, an image of the mole that makes contact with the hammer may be deformed in a further flattened shape in proportion to the size of the hammer image. Thus a variety of image expressions is possible.

Furthermore, the automatic-action object control section 33 may be set to change the action and the image of the mole in accordance with the moving speed of the hammer when the hammer makes contact with the mole, which is detected by the object contact detection section 34. This enables a game player to feel that the hammer is powered up in proportion to the moving speed of the hammer. For example, the mole may be further flattened in proportion to the moving speed of the hammer. Alternatively, the speed of the mole moving into the hole may be faster. Thus a variety of image expressions may be possible.

Example Applications

In the aforementioned embodiment, the present invention has been explained using an example of the whack-a-mole game. However, the present invention is not limited to the whack-a-mole game, and may be applied to a variety of video games. For example, when the present invention is applied to a baseball video game, an image of a bat held by a batter character operated by a game player may be enlarged in accordance with magnitude of the acceleration detected by a controller. Similarly, when the present invention is applied to a tennis video game, an image of a racket held by a character operated by a game player may be enlarged. Alternatively, when the present invention is applied to an action video game, an image of a weapon held by a character operated by a game player may be enlarged.

Moreover, in the baseball video game, a ball hit by an enlarged bat may fly faster and further away. In the tennis video game, the moving speed of a ball hit by an enlarged racket may be increased. In the action video game, a series of images may be displayed showing that an opponent character is sent flying away when an enlarged weapon hits the opponent character.

In the aforementioned whack-a-mole game, the contact result display control section 35 counts and displays the sum of the moles that a game player whacked. However, the configuration may be suitably changed in accordance with a specification of a game.

For example, in the baseball video game or the tennis video game, the contact result display control section 35 may compute flying distance and flying speed of a ball hit by a bat/racket and display results of the computation, i.e., the flying distance and the flying speed. Alternatively, in the action video game, the contact result display control section 35 may compute a value representing impact of a weapon and the like of a character operated by a game player on an opponent character and display a result of the computation.

Thus, a game will have a great deal of variation and a high amusement value when an object operated by a game player is changed in accordance with the magnitude of acceleration detected by a controller, and an action of another object that makes contact with the object operated by the game player is accordingly changed.

As illustrated in FIG. 8, the aforementioned embodiment exemplifies a case in which the entire hammer image is enlarged without changing its shape. However, the present invention is not limited to this. For example, the image of the operation-target object may be partially enlarged. In the example of the hammer image, only the rest of the hammer excluding the handle may be enlarged.

Moreover, the image of the operation-target object may be switched to another image. This allows the game to have an even greater deal of variety and a higher amusement value. For example, in the example of the hammer image, the image of the hammer may be set to be changed into an image of a plastic hammer, an image of a wood hammer, an image of a metal hammer, or the like in accordance with the acceleration.

However, when an image is switched to another, the amount of computation executed by the game device will be further increased than a case when the image is enlarged or reduced. Therefore, when less processing load is desirable for the game device, the image is desirably changed with the enlargement processing or the reduction processing. This is based on the following reason.

In the enlargement processing and the reduction processing, an identical model is used as the object. Therefore, the enlarged/reduced image is created only by extending/reducing a variety of data forming the model. When the image is changed, on the other hand, another set of model image data is required to be read in and arranged in a predetermined position. Accordingly, the amount of computation will be increased.

Furthermore, in the aforementioned embodiment, an example of changing the image in accordance with acceleration has been described. However, the moving speed of the controller 3 may be computed by integration of the acceleration, and the image may be changed in accordance with the computed moving speed. Alternatively, the image may be changed when the acceleration and the computed moving speed fall into a predetermined range, respectively.

The game system 1 is formed by interconnection among separate components, i.e., the game device 2, the controller 3, and the display device 4. However, the plurality of components may be integrally formed as a portable game system, for instance.

The present invention is not limited to the aforementioned embodiment. A variety of changes are possible for the aforementioned embodiment within the scope of the claims. In other words, the technical scope of the present invention includes an embodiment achieved by the combination of a variety of technical means obtained by suitably changing technical means of the aforementioned embodiment within the scope of the claims.

Industrial Applicability

To enhance an amusement value of a video game, the game device according to the present invention is configured to change an image of an object, which is displayed on a screen and is configured to take actions in conjunction with movement of a controller, depending on acceleration detected by the controller. Therefore, the game device is applicable to a variety of video games other than a whack-a-mole game.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a game system equipped with the present invention. Finally, terms of degree such as "substantially", "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A game system of a video game, comprising:
    a display device being configured to display first, second, and third objects;
    a controller having an acceleration sensor; and
    a game device being configured to execute a video game in which the first object displayed on the display device is moved based on an operational signal indicating acceleration and/or moving speed from the controller, the operational signal indicating acceleration detected by the acceleration sensor, the game device having
        an operation-target object control section being configured to display the second object to replace the first object when the acceleration and/or moving speed of the controller is within a predetermined range, the second object being different from the first object, the moving speed of the controller being computed based on the acceleration,
        the operation-target object control section being configured to detect whether or not the third object is displayed, the third object including a third contactable area,
        the operation-target object control section being configured to render the first object, which includes a first contactable area, to make contact with the third object at the first contactable area and the third contact area in the video game when the third object is displayed,
        the operation-target object control section being configured to render the second object, which includes a second contactable area, to make contact with the third object at the second contactable area and the third contactable area in the video game when the third object is displayed,
        the first contactable area having a first size,
        the second contactable area having a second size,
        the first size being larger than the second size,
        the third contactable area being set while the third object is displayed,
        the third contactable area being a part, which is displayed, of the third object.

2. The game system according to claim 1, wherein the operation-target object control section displays the first object again replacing the second object after a predetermined period of time during which the operational signal doesn't indicates that the acceleration and/or moving speed of the controller is within the predetermined range after the second object is displayed.

3. The game system according to claim 2, wherein
    the operation-target object control section changes the first object into the second object by at least partially enlarging or reducing the first object.

4. The game system according to claim 3, wherein
    the operation-target object control section sets a speed of the first object moving on the display device to be different from a speed of the second object moving on the display device with respect to an identical value of the acceleration or the moving speed.

5. The game system according to claim 4, wherein
    the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

6. The game system according to claim 5, wherein the game device further includes a contact result display control section that assesses the contact condition based on a predetermined assessment criterion, and controls display of a result of the assessment on the display device.

7. The game system according to claim 3, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

8. The game system according to claim 2, wherein the operation-target object control section sets a speed of the first object moving on the display device to be different from a speed of the second object moving on the display device with respect to an identical value of the acceleration or the moving speed.

9. The game system according to claim 8, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

10. The game system according to claim 2, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

11. The game system according to claim 1, wherein the operation-target object control section changes the first object into the second object by at least partially enlarging or reducing the first object.

12. The game system according to claim 11, wherein the operation-target object control section sets a speed of the first object moving on the display device to be different from a speed of the second object moving on the display device with respect to an identical value of the acceleration or the moving speed.

13. The game system according to claim 12, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

14. The game system according to claim 11, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

15. The game system according to claim 1, wherein the operation-target object control section sets a speed of the first object moving on the display device to be different from a speed of the second object moving on the display device with respect to an identical value of the acceleration or the moving speed.

16. The game system according to claim 15, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and
   an automatic-action object control section to control at least either of post-contact action or post-contact shape of the third object in accordance with a contact condition detected by the object contact detection section.

17. The game system according to claim 1, wherein the first object or the second object are configured to contact a third object in a virtual space of the game, the third object being different from the first object and the second object, and the game device further includes
   an object contact detection section to detect a condition in which either of the first object or the second object makes contact with the third object in the virtual space of the game, and an automatic-action object control section to control at least either of post-contact action or post-contact shape of the third object in accordance with a contact condition detected by the object contact detection section.

18. The game system according to claim 17, wherein the game device further includes a contact result display control section that assesses the contact condition based on a predetermined assessment criterion, and controls display of a result of the assessment on the display device.

19. A game control method for controlling a game device for a video game, comprising:
displaying first, second, third objects;
executing by the game device a video game in which the first object displayed on a display device is moved based on an operational signal of a controller having an acceleration sensor;
indicating by the operational signal a position of the controller with respect to the display device and acceleration of the controller detected by the acceleration sensor;
displaying the second object instead of the first object when at least either of the acceleration of the controller indicated by the operational signal and/or moving speed of the controller is within a predetermined range, the second object being different from the first object, the moving speed of the controller being computed based on the acceleration;
detecting whether or not the third object is displayed, the third object including a third contactable area;
rendering the first object, which includes a first contactable area, to make contact with the third object at the first contactable area and the third contactable area in the video game; and
rendering the second object, which includes a second contactable area, to make contact with the third object at the second contactable area and the third contactable area in the video game,
the first contactable area having a first size,
the second contactable area having a second size,
the first size being larger than the second size,
the third contactable area being set while the third object is displayed,
the third contactable area being a part, which is displayed, of the third object.

20. A non-transitory computer readable medium storing a game control program for controlling a video game, comprising:
code for displaying first, second, and third objects;
code for executing on the game device a video game in which a first object displayed on a display device is moved based on an operational signal of a controller having an acceleration sensor;
code for indicating by the operational signal a position of the controller with respect to the display device and acceleration of the controller detected by the acceleration sensor;
code for displaying a second object instead of the first object when at least either of the acceleration of the controller indicated by the operational signal or moving speed of the controller falls within a predetermined range, the second object being different from the first object;
code for detecting whether or not the third object is displayed, the third object including a third contactable area;
code for rendering the first object, which includes a first contactable area, to make contact with the third object at the first contactable area and the third contactable area in the video game; and
code for rendering the second object, which includes a second contactable area, to make contact with the third object at the second contactable area and the third contactable area in the video game,
the first contactable area having a first size,
the second contactable area having a second size,
the first size being larger than the second size,
the third contactable area being a part, which is displayed, of the third object.

* * * * *